H. K. MOORE.
GAS ANALYZING APPARATUS.
APPLICATION FILED NOV. 29, 1910.
1,182,851.
Patented May 9, 1916.
2 SHEETS—SHEET 2.
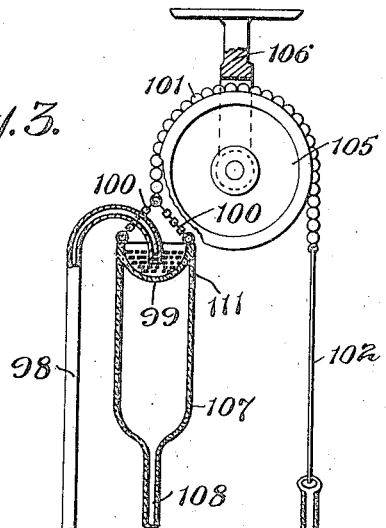
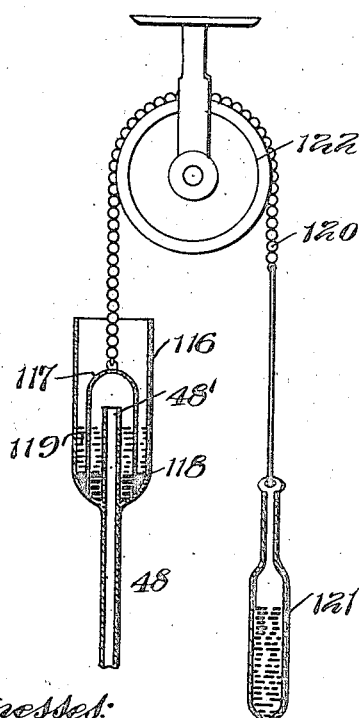
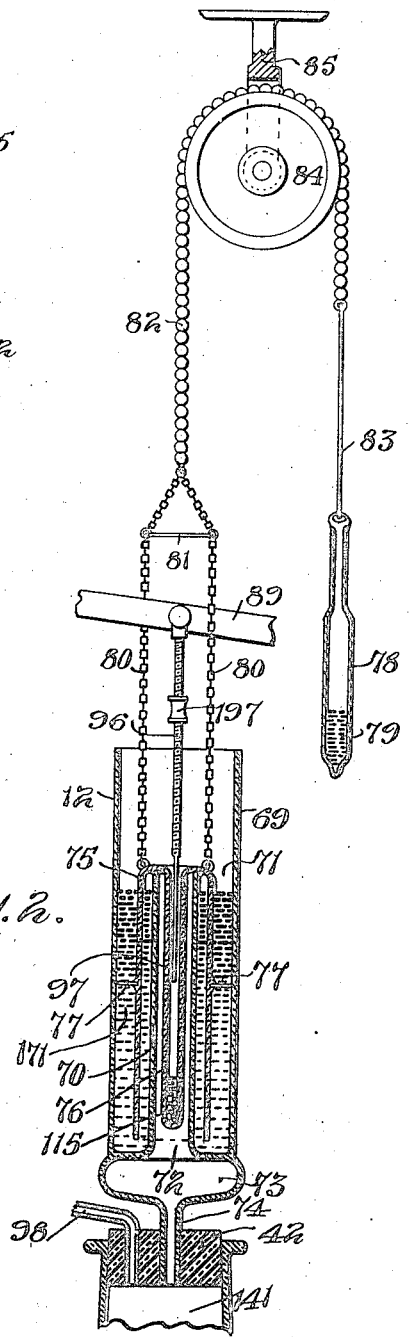
Witnesses:
H. L. Allen
F. R. Ronlstone
Inventor:
Hugh K. Moore;
By Wright Brown Quinby & Co.
by Marcus B. May
Attys.

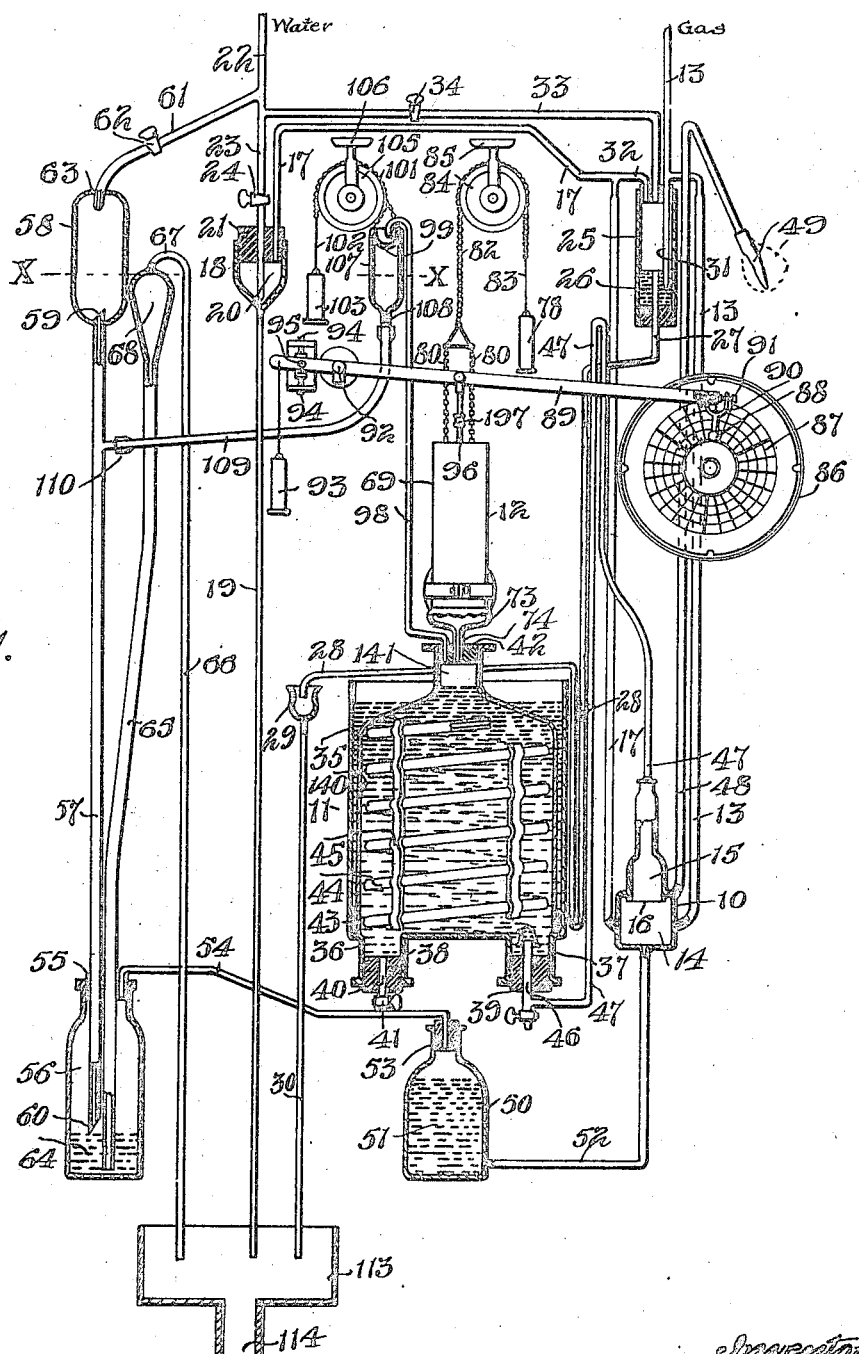

UNITED STATES PATENT OFFICE.

HUGH K. MOORE, OF BERLIN, NEW HAMPSHIRE, ASSIGNOR OF ONE-HALF TO JOSIAH QUINCY, OF BOSTON, MASSACHUSETTS.

GAS-ANALYZING APPARATUS.

1,182,851. Specification of Letters Patent. Patented May 9, 1916.

Application filed November 29, 1910. Serial No. 594,707.

*To all whom it may concern:*

Be it known that I, HUGH K. MOORE, of Berlin, in the county of Coos and State of New Hampshire, have invented certain new and useful Improvements in Gas-Analyzing Apparatus, of which the following is a specification.

My invention has relation to methods and instrumentalities for accurately determining the proportion of any given gas in a composite gas or a mixture of gases.

In carrying out the invention, a charge of the initial admixture of gases, or what I term the initial gas, is drawn by suction through a measuring chamber in excess of the amount to be measured, and it is exposed to atmospheric pressure, so that, when the measuring takes place, the gas is itself at atmospheric pressure irrespective of its previous condition. A given or measured volume of gas is then segregated, and forced through the absorbent material, the resultant or unabsorbed gases escaping therefrom into a closed chamber, so that, as the gas enters the chamber, a movable element, which is accurately balanced, is moved by the gas and effects the movement of a recording or tabulating device. After the movable chamber has completed its movement according to the volume of the resultant gas, a port is opened to the atmosphere by means of an automatically actuated sealing device, thereby permitting the escape of the gas within the chamber and the re-location of the chamber in its initial position. I utilize any suitable pump or injector for drawing or sucking the gas into the initial measuring chamber, and provide a by-pass around the measuring chamber, in consequence of which, when the latter has been charged, I exhaust from the supply pipe a succeeding large volume of gases, so that the next charge which is measured will be separated by a large volume of gas from that last measured. I also utilize a stream of water for forcing the gas from the measuring chamber into the absorber, but to prevent an absorption thereby of the gas I interpose between said stream and the measuring chamber a chamber containing a fluid which will not absorb any of the constituent gases of the initial gas; such for instance, as water saturated with the constituent gases soluble therein.
The pressure upon the gas in the measuring chamber is accomplished by trapping the stream of water in a hollow column of sufficient height so that its pressure upon the fluid in the intermediate chamber is sufficient to force the gas through the absorber, a siphon being utilized to discharge the water from the column after the gas to be measured has passed through the absorber and has been collected in the final measuring chamber without discharging the fluid in the intermediate chamber. I also connect with the column which contains the water, a balanced chamber which, by a mercury seal, closes the port to the final measuring chamber, so that, when the water reaches a predetermined height in the column, it also partially fills the balanced chamber so as to carry it downward and open the port to the final measuring chamber, thereby permitting the escape of gases therefrom.

In addition to the features above mentioned, the illustrated embodiment of the invention comprises numerous other features which are of importance and which I will describe in detail in the following specification, such, for instance, as the means by which I secure a wholly fresh charge of gas for the primary measuring chamber, and also by which the apparatus corrects itself automatically, after each operation, for expansion or contraction of the absorbent by reason of variations in temperature or evaporation or the chemical action between the absorbent and the gas absorbed thereby, or by the absorption of gases by any of the materials used in the absorbing apparatus.

Referring to the drawings,—Figure 1 represents an apparatus which I have devised for carrying out the process which contains features of my invention. Fig. 2 represents the final measuring chamber. Fig. 3 represents the means for permitting the discharge of the measured gas. Fig. 4 illustrates another form of device by which the gas in the initial measuring device is kept at atmospheric pressure as it is being measured.

On the said drawings,—10 indicates an initial measuring device into which the initial gas is drawn and a predetermined volume segregated or measured at atmospheric pressure.

11 indicates as a whole a gas absorber which removes from the initial gas one of the admixed gases.

12 indicates as a whole a final device for measuring the resultant gases after the absorption of one of the gases.

The initial gas is drawn through a tube or conduit 13. This tube is connected with a pipe which is introduced into the flue or gas supply, and, in the event that flue gases are being measured, there is interposed in the path of the gas a filter for removing the free carbon. The tube 13 extends to the measuring device 10. The said measuring device consists of two communicating chambers 14, 15, the wall of the chamber 15 being extended by a lip into the chamber 14 as indicated at 16. The chamber 14 may be called the "receiving chamber" and the chamber 15 the "measuring chamber." The tube 13 communicates with the receiving chamber about midway between its ends as illustrated in Fig. 1. For drawing the gas into the receiving chamber, there is connected with said chamber opposite the tube 13 a tube or conduit 17 which is extended upwardly some distance and then bent downward so as to communicate with a pump indicated as a whole at 18. Said pump consists of a vertical tube 19 having a bulb or chamber 20 at its upper end closed by a plug 21 through which the tube or conduit 17 extends.

22 is a supply pipe from which water or other suitable liquid is drawn from a source of supply, and said pipe has a branch 23 which delivers the water through the plug 21 into the chamber 20, so that in its downward flow, it removes or carries out the air and gas contained in chamber 15 and draws a supply of gas through tube 13, receiving chamber 14 and tube 17. The stream of water flows through the supply pipe 22 and the pump continuously so that the gas is being constantly drawn through the gas supply pipe 13. There is a by-pass for the gas around the chamber 10, so that, when the measuring chamber is in operation, there will be no interruption in the inflow of gas through the supply pipe 13, and consequently, when a charge is segregated and being measured, sufficient gas is exhausted by the pump so that the next charge will not be a part of the same gas which was previously measured, but will be separated therefrom by a large volume of gas which is discharged by the pump to the atmosphere. The by-pass comprises a closed tank or receptacle, 25, in the lower end of which a quantity of water or other fluid 26 is maintained by an overflow standpipe 27 which is carried downwardly to form a loop 28 and which discharges into a funnel 29 at the upper end of a discharge pipe or tube 30. The gas conduit 13 is provided with a branch 31 extending into the tank or receptacle 25 and having its lower end terminating below the level of the liquid 26 therein.

Connected with the tube 17 there is a branch 32 which extends into the upper end of the tank 25, so that, when the initial measuring chamber is in operation, the gas will be drawn by the pump downwardly through the pipe 31, up through the liquid 26, and out through the branch 32. Ordinarily, however, the presence of the body of liquid 26 is sufficient to offer such resistance to the passage of the gas through the by-pass that the gas will be drawn through the initial measuring device. In order that the tank or receptacle 25 of the by-pass may always contain water or other liquid, the water supply pipe 22 has a branch 33 which is connected with the upper end thereof. The two branch pipes 23, 33 are respectively provided with valves 24, 34, by which the flow of liquid therethrough may be controlled or cut off.

The gas absorbing apparatus comprises a tank or receptacle 35 formed at its lower end with two nipples 36, 37 respectively closed by plugs 38, 39. Through the plug 38 extends a discharge pipe 40 having a valve 41, so that, when desired, the contents of the absorbing apparatus may be withdrawn to be replaced by fresh absorbing material. Fitting in the tank or receptacle and resting upon the bottom thereof, is a bell or dome 140 terminating in a neck 141 closed by a plug 42. After the tank or dome is charged with proper absorbing material, mercury or other heavy sealing material is poured into the space between the bell and the tank, as indicated at 43, so as to prevent the possible escape of gas and also to prevent fluctuations in the height of the absorbing material in the bell. Within the bell is placed a helix 44, the convolutions of which are spaced by spacers indicated at 45. The lower end of the helix is open to the entrance of the absorbing liquid and its upper end terminates below the level of said liquid so that it is constantly filled with such liquid. For convenience, the lower end of the helix is shown as flaring so that it will receive the gas which is delivered into the bell through the inlet pipe 46, and preferably the upper end of the helix is spiral so that it terminates nearer the center of the bell than the other convolutions of the helix. The inlet pipe 46 communicates with a pipe or conduit 47 which is bent upward to form a loop and then communicates with the upper end of the measuring chamber 15. The bore of the pipes 46 and 47 is exceedingly small and the volume of the bore of the pipe 47 from the level of the liquid in the bell to the top of the measuring chamber from the wall or lip 16 upward to the pipe 47 is predetermined,—for instance, 100 cubic centimeters.

The receiving chamber 14 of the initial measuring device has connected therewith a pipe 48 which communicates with said chamber above the lower end of the lip or wall 16. This pipe 48 extends vertically above the by-pass chamber 25, and is then bent downward having connected with its end a light flexible normally-deflated rubber bag 49 which is exposed to atmospheric pressure, so that, when the inlet and outlet gas-conduits or pipes 13 and 17 are closed at their points of communication with the receiving chamber 14, the gas contained in said chamber, as well as in the measuring chamber 15, will be exposed to atmospheric pressure. The bag 49 is normally deflated so as to contain substantially no gas, it being maintained in this condition because of the suction created in the chambers 14 and 15 by the pump 18.

For the purpose of segregating a charge of gas of predetermined volume and forcing the measured gas through the absorber, I employ the following devices: 50 indicates an intermediate tank or chamber located below the absorber and containing non-absorbent liquid as indicated at 51, the normal level of which is indicated on the drawings. The lower end of the intermediate tank is connected by a pipe or tube 52 with the lower end of the receiving chamber 14. The neck of the tank 50 is closed by a plug 53 through which extends a pipe or tube 54, the other end of which extends downwardly through the plug 55 of a tank or vessel 56 located at substantially the same level as that at 50 but being somewhat greater in height. Extending into the tank 56, which I may for convenience term the "pressure tank", is a vertical tube or pipe 57 which extends upwardly some distance and is provided at its upper end with a bulb or enlargement 58. The pipe 57 has a beveled lip 59 extending into the bulb, and its lower end, which terminates near the bottom of the pressure tank or chamber 56, is likewise beveled as indicated at 60, the bevels being oppositely disposed. The water supply pipe 22 is connected with a branch 61 having a valve 62 and extending through (but not closing) an aperture 63 in the upper end of the bulb 58. When water enters the bulb, it flows down through the pipe 57 into the pressure tank 56, the beveled ends 59 and 60 permitting the upflow of air during the downflow of water through said pipe 57. As the level of the water (which is indicated at 64 in the tank 56) rises, the air contained in said tank is forced through the tube or conduit 54 into the upper end of the intermediate chamber 50, and the liquid therein contained is forced through the pipe 52 upwardly into the receiving chamber 14 until it rises above the lower ends of the pipes 13 and 17 so as to cut off the flow of gas through said chamber 14. As the level of the liquid continues to rise in the chamber 14, the gas thereabove escapes into the pipe 48 and into the gas bag 49, partially filling the latter without stretching the rubber, and remaining at atmospheric pressure until the level of the liquid touches the lip 16 and closes the lower end of the measuring chamber 15. The water, continuing to flow into the tube 57 and gradually filling the pressure chamber 56 and the tube 57, continues to force the liquid 51 out of the intermediate chamber 50, and consequently the gas in the measuring chamber 15 is forced through the pipe 47 and the pipe 46 and is discharged into the absorber. It enters the lower end of the helix, and, in passing through the convolutions of the helix, is so mixed with the absorbent that such gas as may be absorbed by said material chemically combines therewith during the passage of the volume of gas through the helix. The unabsorbed gas in the upper end of the helix bubbles through the absorbent and collects in the neck 141 of the bell and is measured, as will be explained. After the measuring has taken place, it is necessary that the liquid should flow back from the measuring chamber 15 and the receiving chamber 14 into the intermediate tank 50, and consequently I provide means for siphoning out the water which has been permitted to flow into the pressure tank or chamber 56. The siphon consists of a tube having two limbs 65, 66, the former of which is somewhat greater in diameter than the latter. The limb 65 has, at its upper end just below the bend 67, a bulb or enlargement 68, the bend 67 being below the upper end of the bulb 58, so that, when the water rises in said bulb 58 above the bend 67, the siphon will be charged and it will operate automatically to withdraw the contents of the pressure chamber 56. The lower end of the limb 65 is near the bottom of the pressure chamber and the lower end of the limb 66 naturally terminates in a plane below the plane of said pressure chamber. As soon as the siphon withdraws the liquid from the pressure chamber 56, the liquid from the receiving and measuring chambers 14 15 flows back into the intermediate tank or chamber 50 to the level indicated in Fig. 1. When the siphon breaks, there is sufficient water left in the limb 65 and bulb 68 to fill the pressure chamber to substantially the level indicated, and finally trap the water flowing through the pipe or conduit 57.

The device for measuring the resultant or unabsorbed gas, after the absorption of one of the gases by the absorber, is illustrated in Fig. 2. It consists of a cylindrical receptacle 69 which has an inner cylindrical wall 70 forming an annular space 71 which is filled with a nonvolatile material or liquid such as glycerin as indicated at 171. The wall 70 forms a duct 72 communicating with a chamber 73, the walls of the receptacle being formed with a reduced nipple 74 which is inserted in the neck 141 of the bell 140. 75 indicates a bell or movable measuring chamber which is inserted in the receptacle 69, said bell having a hollow spindle 76 which projects downwardly into the duct 72. The bell is provided with radial guide pins 77 of suitable number engaged in the outer wall of the receptacle so as to keep it from lateral movement when it rises and falls. By this construction, the duct 72 and chamber 73, which communicate with the neck of the bell 140, are sealed against the escape of gas, but the said bell is forced upward as the gas bubbles through the absorbing material in the absorber. The bell 75 is counterbalanced by a weight which consists of a vial 78 partially filled with mercury as indicated at 79. The weight and the bell are connected by two light chains 80, 80 or other flexible connections held apart by a spreader 81, a series of flexibly connected weights 82 and a wire, cord or other connection 83. The flexibly connected weights 82 pass over a peripherally grooved wheel 84 journaled in a bearing bracket 85. The weights 82 are accurately calculated, so that, as the bell rises and said weights pass over the wheel 84, they compensate directly for the loss of buoyancy due to the emergence of the bell from the glycerin in the annular chamber 71 and the unbalanced weight of the recording lever to be described. The parts are so balanced that the bell is just enough heavier than the weight 78, taking the flexibly connected weights 82 into account, that it will slowly sink to the position shown in Fig. 2. When the unabsorbed gas bubbles through the absorber, it rises in the duct 72 and lifts the bell, while substantially at atmospheric pressure, the extent to which the bell rises being dependent upon the volume of unabsorbed gas discharged through the absorbing material. For recording the volume of unabsorbed gas thus measured, I employ a disk 86 which is rotated by suitable clock-work (not shown) once in every twenty-four hours, said disk having provisions for the receipt of circular charts such as that indicated at 87. 88 indicates a pen pivoted to swing toward and from the chart on the end of a lever 89. The penholder is indicated as having a yoke 90 through which fine pointed screws 91 engage complemental sockets in the ends of said lever. The lever is pivoted or fulcrumed at 92 and its other end has depending therefrom a weight 93 so that the pen-carrying end is just enough heavier than its other end to cause it to assume the position shown in Fig. 1. The play of said arm may be limited by adjusting screws 94 above and below a pin 95 on the shorter arm of said lever. Although the weight 93 is shown conventionally in Fig. 1, it may consist of a vial substantially like that at 78 more or less filled with mercury for adjustment purposes. Loosely pivoted to the lever 89 is a depending screw bar 96 having at its extremity a pin 97. The screw and the pin are adapted to enter the bore of the hollow stem 76 depending from the middle of the bell 75. On the screw bar 96 is an adjustable abutment or stop 197 which takes the form of a nut and which is adapted to be engaged by the upper end of the bell 75 as the bell rises, so that the continued movement of the bell will swing the lever 89 upward about its fulcrum and move the pen 88 substantially radially of the chart 87, and hence upon the chart will be indicated by a line the extent to which the bell has risen and consequently the volume of the unabsorbed gas discharged from the absorber. By providing a certain amount of lost motion between the bell 75 or movable element of the final measuring device and the lever 89, I am able to use a chart of less diameter than if no such lost motion were provided.

Since means must be provided for permitting the escape of the measured gas, I provide a pipe 98 which has a relatively small bore, the lower end of said pipe extending through the plug 42 and communicating with the final measuring chamber 12 through the chamber 73 and duct 72. The pipe is carried vertically upward and at its upper end is provided with a downward bend, the extremity of which projects normally into a movable mercury cup 99 (see Fig. 3) so that ordinarily the gas chamber in the bell 140 and the movable gas chamber of the measuring device 12 are normally sealed. The mercury cup is suspended by light chains 100 connected to a series of flexibly connected weights 101, the latter in turn being connected by a cord, wire or other connection 102 with a weight 103, which said weight may consist of a vial more or less filled with mercury as indicated at 104. The flexibly connected weights 101 extend over a peripherally grooved wheel 105 journaled in a bearing bracket 106. The mercury cup 99 is formed in the upper end of a movable chamber 107 terminating at its lower end in a nipple 108. This nipple is connected by a rubber tube or other flexible connection 109 with a branch nipple 110 projecting laterally from the water pipe 57. After the arm 89 has completed its upward movement, due to the rising of the movable element 75 of the measuring device, the weight of the water, which flows into said chamber 107, is sufficient to overbalance the weight 103 and depress the mercury cup 99 so as to open the pipe 98 and permit the escape of the gas in the final measuring chamber, the interior of the said chamber being thus open to the atmosphere. By opening the final measuring chamber and the absorbing chamber to the atmosphere, each time the unabsorbed gases of a charge is measured, I prevent any accumulation of errors such as would otherwise be caused by variation in the height of the absorbent due to evaporation, thermal changes, chemical action, etc. The dotted lines $x\ x$ in Fig. 1 indicate the level of the water in the chamber 107 and in the pipe 57 and bulb 58 when the mercury cup begins to descend. The chamber 107 has an opening to the atmosphere at 111 so that air cannot be trapped therein.

The apparatus, which I have described, is inclosed in a suitable casing provided with a glazed front door having a lock, but it has not been deemed necessary to illustrate such casing on the drawing because it adds nothing to the invention. In actual practice, the apparatus is more compact than as shown in Fig. 1, because in said figure the parts are spread out in order that they may be seen without confusion. In the main, Fig. 1 illustrates the apparatus with the parts in their respective locations as to altitude and the levels of the various liquids are illustrated as they are when the operation is just about to start. For the various receptacles, chambers, tubes, conduits, etc., I employ material which will not be affected by the chemicals or the gases which are used. As illustrated, the tubes, with the exception of that indicated at 109, are all made of glass as are the various receptacles. Where desirable for convenience in construction, the pipes may be made in section connected by suitable couplings, such as short lengths of pure rubber tubes.

The operation of the device is as follows: Water being supplied from a constantly running stream to the inlet pipe 22 is delivered to the bulb 58 of tube 57, the receptacle 25 of the by-pass, and to the pump comprising the bulb or chamber 20 and for the pipe 19. The pump draws flue gases (for instance) through the inlet pipe 13, the receiving chamber 14, and the pipe 17, until the water, delivered to the pipe 57, rising sufficiently in the pressure chamber 56 causes the air therein to force the non-absorbent liquid 51 from the intermediate chamber up through the pipe 52 until it seals the entrance of pipes 13 and 17 to the receiving chamber 14. Thereafter the gases are drawn by the pump through the bypass, and are discharged into the atmosphere in the lower end of the pump 18. As the water rises in the pipe 57 and the limb 65 of the siphon, the liquid from the intermediate chamber rises in the receiving chamber, and a portion of the gas which remains in the receiving chamber passes through the pipe 48 into the rubber bag 49 (which is of such dimensions that it can receive slightly more gas than would fill said receiving chamber) until the level of the liquid in the receiving chamber 14 seals the lower end of the measuring chamber 15, and segregates a predetermined volume of gas under atmospheric pressure; for instance, 100 cubic centimeters. As the pipe 57 fills the fluid 51 gradually forces the mixed gases out from the measuring chamber through the minute bore of pipes 47 and 46 into the absorbent fluid, which, in the supposed case, is a solution of caustic soda. The carbon dioxid is absorbed or chemically unites with the caustic soda and the unabsorbed gases such as oxygen, carbon monoxid, etc., collect in the neck of the bell 140 and pass into the movable chamber 75 of the measuring device. They raise said chamber or bell 75, until the bell, engaging the stop 197 and raising the lever 89, thereby causes the pen 88 to indicate upon the chart the extent to which the bell has risen and thus record the volume of the unabsorbed gas at atmospheric pressure. As the water rises in the pipe 57, it also rises in the siphon limb 65 and also flows through the flexible tube 109 into the chamber 107. Before the siphon 65 66 is charged, for instance, when the water in the chamber 107 reaches the level indicated by the dotted line $x\ x$, the mercury seal will be broken by the added weight to the mercury cup, and the gas chamber in the measuring device will be opened to atmospheric pressure so as to permit the discharge of the measured unabsorbed gas and the bell or chamber 75 will move downward to its initial position. As soon as the water reaches and fills the bend 67, the siphon becomes charged and the water is withdrawn from the pressure chamber 56. As the water is discharged from said chamber the nonabsorbent fluid 51 flows back into the intermediate chamber or receptacle 50. As soon as the siphon breaks, the water which is in the bulb 68 flows back into the pressure chamber 56 and seals the lower end of the siphon at a point just below the lower end 60 of the pipe 57. As the pipe 57 empties, the water is discharged from the chamber 107 and permits the mercury cup to rise so as to again seal the escape pipe 98 and the measuring chamber.

By regulating the flow of water through the inlet pipe 22, the apparatus may be timed so as to operate with any desired frequency.

The limb 66 of the siphon, the pump 18 and the discharge pipe 30 are illustrated as discharging into a tank 113 having a pipe 114 connected with the sewer. Into the hollow stem 76 of the bell 75, I may introduce mercury as indicated at 115, in the event that the balance is in favor of the weight 78.

I have not deemed it necessary to illustrate the mechanism for effecting the rotation of the chart, as any clock-work mechanism, such as used for recording gases, may be employed for the purpose.

It will be understood that, while I have shown the best form of the invention now known to me, nevertheless many of the parts shown may be replaced by their equivalents. For illustration, I may utilize some other form of pump than that shown, although the one illustrated is very simple and operates satisfactorily. Other means for unsealing the final measuring chamber may be utilized and various other substitutions and changes may be made if deemed desirable without departing from the spirit and scope of the invention. For illustration, in lieu of the bag 49 by which I am enabled to effect the initial measuring of the mixed gases at atmospheric pressure, I may utilize a float, as shown in Fig. 4. In this case, the pipe 48 is provided at its upper end with a receptacle 116 to receive a bell 117, the pipe 48 being extended upwardly into the bell as shown at 48'. When at rest, the bell 117 dips into a mercury seal 118, there being at 119 a body of water or other liquid. The bell is counter-balanced by a compensating chain 120 having attached to its free end a suitable weight 121 similar to those shown at 78 and 103. The chain tracks upon a freely rotatable wheel 122. When the gas passes up through the conduit 48, the bell 117 rises and its loss of buoyancy is compensated for by the compensating chain. The volume of the bell, when it is raised, is equal to the volume in the bore of the pipe 48, or, if desired, is a trifle in excess. The effect of this construction is that, when the water is rising in the chamber 14, the gas, flowing through the pipe 48, will lift the bell to its upper limit of movement, after which the gas will escape from the receptacle by bubbling through the water which surrounds the float, the lip of the float at this time being submerged but a very short distance below the level of the water. When the initial measuring is taking place and gas is being again drawn through the chamber 14 by the pump, the bell will be drawn downward by the suction and come to a state of rest at the point illustrated in Fig. 4. In this way, none of the gas, which is delivered to the bell, will be drawn back into the chamber 14, because the gas which is in the bell is submerged sufficiently to fill the bore of the pipe 48 when the bell moves back to initial position. By utilizing the mercury seal, I am able to prevent the water from being drawn into the pipe 48 because of the greater specific gravity of the mercury.

Having thus explained the nature of my said invention and described a way of making and using the same, although without attempting to set forth all of the forms in which it may be made or all of the modes of its use, what I claim is:

1. In a gas analyzing apparatus, the following instrumentalities, to wit: an initial gas-measuring device having a gas inlet and a gas outlet and constructed and arranged to receive and measure a predetermined volume of mixed gases at atmospheric pressure, means for absorbing one of said gases and connected to said gas outlet, a final measuring device comprising a movable bell partially submerged in liquid and means for compensating for loss of buoyancy as said bell emerges from said liquid, all constructed and arranged to receive and measure at atmospheric pressure only the charge of unabsorbed gas discharged from the absorber and initial measuring device, a connection between said final measuring device and said absorber, and means by which said instrumentalities are caused to perform their described functions automatically and sequentially.

2. In a gas analyzing apparatus, an initial gas-measuring device provisioned to receive and measure a predetermined volume of mixed gases, an absorber, a pipe connecting said absorber with said measuring device, a final measuring device for the unabsorbed gases consisting of a balanced bell, a gas supply pipe connected to the initial measuring device, a gas outlet pipe leading therefrom, an automatic pump connected to the said outlet pipe, and a by-pass for gases connected to said supply pipe and said pump around said initial measuring device.

3. In a gas analyzing apparatus, a measuring device comprising a receiving chamber and a communicating measuring chamber, means for drawing a stream of gas therethrough, a by-pass for the gas around said measuring device, a connection with said measuring device by which the gas therein is exposed to atmospheric pressure, and automatic means by which a predetermined volume of gas is segregated in said measuring chamber and communication with said connection is cut off.

4. In a gas analyzing apparatus, a measuring device comprising a receiving chamber and a communicating measuring chamber, said measuring chamber having a lip depending into the receiving chamber, a conduit having means connected therewith for exposing gas to atmospheric pressure, said conduit communicating with said receiving chamber above the lower end of said lip, a gas inlet conduit and a gas outlet conduit connected with the receiving chamber below said lip whereby a stream of gas may be drawn through said receiving chamber, a final measuring device, an absorber, a conduit connecting said measuring chamber to said absorber, and means for automatically forcing the measured gas from said measuring chamber through said absorber into the final measuring device.

5. In a gas analyzing apparatus, a final measuring device, an absorber connected therewith to deliver unabsorbed gas thereto, and an initial measuring device comprising a receptacle connected at its upper end to said absorber and having at its lower end gas inlet and outlet conduits by which a stream of gas may be drawn therethrough, and means for forcing gas from said measuring device through said absorber, comprising an elongated liquid-receiving conduit, means for automatically charging and discharging said conduit, and a chamber interposed between said liquid receiving conduit and said receptacle having a trapped body of nonabsorbent liquid, adapted to be forced into said receptacle when the liquid conduit is charged, to force the measured gas through the absorbers and the unabsorbed gas into the final measuring device.

6. In a gas analyzing apparatus, a final measuring device, an absorber, an initial measuring device comprising a receptacle having a gas inlet, an air compressor tank, a vertical conduit for delivering a constant stream of liquid thereto, means for intermittently discharging the liquid from said tank, an intermediate tank connected to the upper end of said compressor tank to receive air therefrom, said intermediate tank containing a nonabsorbent liquid, and a conduit for conducting the liquid from said intermediate tank to said receptacle to force the gas therefrom through said absorber.

7. In a gas analyzing apparatus, a final measuring device, an absorber, an initial measuring device comprising a receptacle having a gas inlet and a gas outlet to permit a stream of gas to be drawn therethrough, a compressor tank, a vertical conduit for delivering liquid thereto, an intermediate tank connected to the upper end of said compressor tank to receive air therefrom, said intermediate tank containing a nonabsorbent liquid, and a conduit for conducting the liquid from said intermediate tank to said receptacle, means for delivering a constant stream of liquid to said compressor tank, and means for automatically and intermittently withdrawing the liquid from said compressor tank.

8. In a gas analyzing apparatus, a final measuring device, an absorber, an initial measuring device comprising a receptacle having a gas-measuring chamber communicating with said absorber, and a receiving chamber below but opening into said measuring chamber, a gas inlet leading to said receiving chamber, a gas outlet leading therefrom, a trapped by-pass for the gas around said measuring device, a suction pump connected with said outlet and said by-pass, a water supply pipe, and means for intermittently trapping a body of water and thereby causing a flow of liquid into said receiving chamber and measuring chamber to seal said gas inlet and said gas outlet and to force the gas in said measuring chamber into said absorber.

9. In a gas analyzing apparatus, a final measuring device, an absorber, an initial measuring device, a pump and inlet and outlet conduits for drawing gas through the initial measuring device, a gas-retarding by-pass around said initial measuring device and connected to said inlet and outlet conduits, a liquid-containing intermediate chamber communicating with said initial measuring device, and means for automatically and intermittently forcing nonabsorbing liquid from said chamber into said initial measuring device to check the flow of gas therethrough and to force the gas therein into said absorber, and permitting the return of the same nonabsorbing liquid to said intermediate chamber.

10. In a gas analyzing apparatus, a final measuring device for the unabsorbed gas, said device comprising a liquid receptacle, a movable gas-receiving chamber whose side walls are immersed in the liquid in said receptacle, a conduit for unabsorbed gas to said movable chamber, a weight almost counterbalancing said chamber, a pulley, and a connection between said weight and said chamber comprising a series of weights which compensate for the loss of buoyancy of said chamber as it emerges from said liquid.

11. In a gas analyzing apparatus, an initial gas-measuring device, an absorber comprising a receptacle containing a body of gas-absorbent liquid, a final gas-measuring device having a movable chamber communicating with said absorber chamber above said liquid, an upright liquid-receiving conduit connected to said initial measuring device to effect the transfer of gas from said device to said absorber, a conduit communicating with said absorber receptacle above said liquid therein, and a counterbalanced movable seal for said conduit having a liquid-receiving chamber connected with said upright liquid-receiving conduit, said instrumentalities being disposed and arranged whereby liquid is delivered into the chamber of said seal to move it after the movable chamber of the final measuring chamber has completed its movement in measuring the unabsorbed gas and thus to break the seal and allow the unabsorbed gas to escape from the final measuring chamber.

12. In a gas analyzing apparatus, an initial measuring device comprising a receiving chamber and a measuring chamber, a gas inlet conduit leading to said gas receiving chamber, a gas outlet conduit leading from said chamber, a gas retarding by-pass around said measuring device connected to said inlet and outlet, a pump connected to said outlet, an absorber connected to said measuring chamber, a final measuring device connected to said absorber, a relief gas conduit connected to said final measuring device, a balanced sealing chamber for sealing the last-mentioned conduit, a pressure tank, an intermediate liquid containing chamber having its upper end connected to the upper part of the pressure tank, and its lower end connected to the receiving chamber of said initial measuring device, an upright conduit for delivering a constantly flowing stream of water to said pressure tank and flexibly connected to said balanced sealing chamber, and a siphon for said pressure tank, substantially as set forth.

In testimony whereof I have affixed my signature, in presence of two witnesses.

HUGH K. MOORE.

Witnesses:
MARCUS B. MAY,
P. W. PEZZETTI.